United States Patent
Touahri et al.

(10) Patent No.: US 12,222,551 B2
(45) Date of Patent: Feb. 11, 2025

(54) VARIABLE OPTICAL ATTENUATOR ARRAYS

(71) Applicant: VIAVI SOLUTIONS INC., Chandler, AZ (US)

(72) Inventors: Driss Touahri, Nepean (CA); Joshua Benjamin Julius Philipson, Ottawa (CA); Christopher Russell Wagner, Kanata (CA); Luis Andre Neves Paiva Fernandes, Maia (PT); Robert Matthew Adams, Ottawa (CA)

(73) Assignee: VIAVI SOLUTIONS INC., Chandler, AZ (US)

( * ) Notice: Subject to any disclaimer, the term of this patent is extended or adjusted under 35 U.S.C. 154(b) by 248 days.

(21) Appl. No.: 17/903,401

(22) Filed: Sep. 6, 2022

(65) Prior Publication Data

US 2024/0077678 A1    Mar. 7, 2024

(51) Int. Cl.
| | |
|---|---|
| *G02B 6/26* | (2006.01) |
| *G02B 6/27* | (2006.01) |
| *G02B 6/35* | (2006.01) |
| *G02B 26/02* | (2006.01) |
| *G02B 6/12* | (2006.01) |

(52) U.S. Cl.
CPC .......... *G02B 6/266* (2013.01); *G02B 6/2726* (2013.01); *G02B 6/3574* (2013.01); *G02B 26/023* (2013.01); *G02B 2006/12109* (2013.01); *G02B 2006/12114* (2013.01); *G02B 2006/12116* (2013.01)

(58) Field of Classification Search
CPC ........ G02B 6/266; G02B 6/2726; G02B 6/32; G02B 6/3574; G02B 26/023; G02B 2006/12109; G02B 2006/12114; G02B 2006/12116
See application file for complete search history.

(56) References Cited

U.S. PATENT DOCUMENTS

| | | | | |
|---|---|---|---|---|
| 5,225,942 | A | * | 7/1993 | Ikeno ................... G02B 6/3827 359/836 |
| 5,226,104 | A | * | 7/1993 | Unterleitner ......... G02B 6/3588 385/47 |
| 5,324,459 | A | * | 6/1994 | Klein .................... B29C 48/687 264/40.5 |

(Continued)

*Primary Examiner* — Ryan A Lepisto
(74) *Attorney, Agent, or Firm* — Mannava & Kang, P.C.

(57) ABSTRACT

A variable optical attenuator (VOA) may include an input collimator with an input fiber connected on one side and an output collimator with an output fiber connected on one side, where the collimators are on a same surface of a VOA enclosure. A retroreflector may receive a light beam from the input collimator and reflect the light beam to the output collimator. The VOA may include an attenuation element positioned between the input collimator and the retroreflector and/or another attenuation element positioned between the retroreflector and the output collimator to provide variable attenuation to the light beam. The attenuation elements may be moved to set an attenuation level by one or more adjustment elements such as a miniature motor. The attenuation element may include a gradient index (GRIN) element, a polarizer, a neutral density filter, or a wavelength tunable filter.

20 Claims, 14 Drawing Sheets

(56) References Cited

U.S. PATENT DOCUMENTS

| | | | | |
|---|---|---|---|---|
| 5,745,634 A * | 4/1998 | Garrett | ............... | G02B 6/3588 |
| | | | | 385/140 |
| 5,900,983 A * | 5/1999 | Ford | ............... | G02B 6/266 |
| | | | | 359/627 |
| 6,374,032 B1 * | 4/2002 | Mao | ............... | G02B 6/266 |
| | | | | 385/140 |
| 6,584,271 B2 * | 6/2003 | Shi | ............... | G02B 6/266 |
| | | | | 385/140 |
| 6,614,958 B1 * | 9/2003 | Schmidt | ............... | G02B 26/02 |
| | | | | 385/140 |
| 6,647,173 B2 * | 11/2003 | Chen | ............... | G02B 6/3582 |
| | | | | 385/47 |
| 6,781,736 B2 * | 8/2004 | Hoyt | ............... | G02F 1/13318 |
| | | | | 385/33 |
| 6,901,182 B2 * | 5/2005 | Yeh | ............... | G02B 6/353 |
| | | | | 385/140 |
| 6,937,809 B1 * | 8/2005 | Zhang | ............... | H04J 14/02216 |
| | | | | 385/24 |
| 7,477,827 B2 * | 1/2009 | Wang | ............... | G02B 6/266 |
| | | | | 385/140 |
| 7,522,808 B2 * | 4/2009 | Wang | ............... | G02B 6/266 |
| | | | | 385/140 |
| 7,948,670 B2 * | 5/2011 | Akashi | ............... | G02B 6/266 |
| | | | | 359/290 |
| 8,538,229 B1 * | 9/2013 | Wang | ............... | G02B 6/266 |
| | | | | 385/140 |
| 2006/0280421 A1 * | 12/2006 | Tanaka | ............... | G02B 26/02 |
| | | | | 385/140 |

\* cited by examiner

800A

800B

VARIABLE OPTICAL ATTENUATOR ARRAYS

TECHNICAL FIELD

This patent application is directed to optical power control in a fiber optic environment, and more specifically, to a variable optical attenuator (VOA) with a retroreflector and an array of VOAs.

BACKGROUND

In a fiber optic networking system, optical signals are transmitted through optical fibers to transfer data, and the system may often require precise control of optical signal levels at various system components. For example, a laser may produce an optical signal to be modulated. An output power of the laser may be controlled because of the laser's inherently varying level. Furthermore, individual components of a fiber optic network may be tested by using a low power optical signal that emulates fiber optic communications over a long distance. Thus, adjustment of power level for exchanged optical signals may be needed for optical test systems, optical signal routing systems, etc.

BRIEF DESCRIPTION OF DRAWINGS

Features of the present disclosure are illustrated by way of example and not limited in the following Figure(s), in which like numerals indicate like elements, in which.

DETAILED DESCRIPTION

Figure 1:
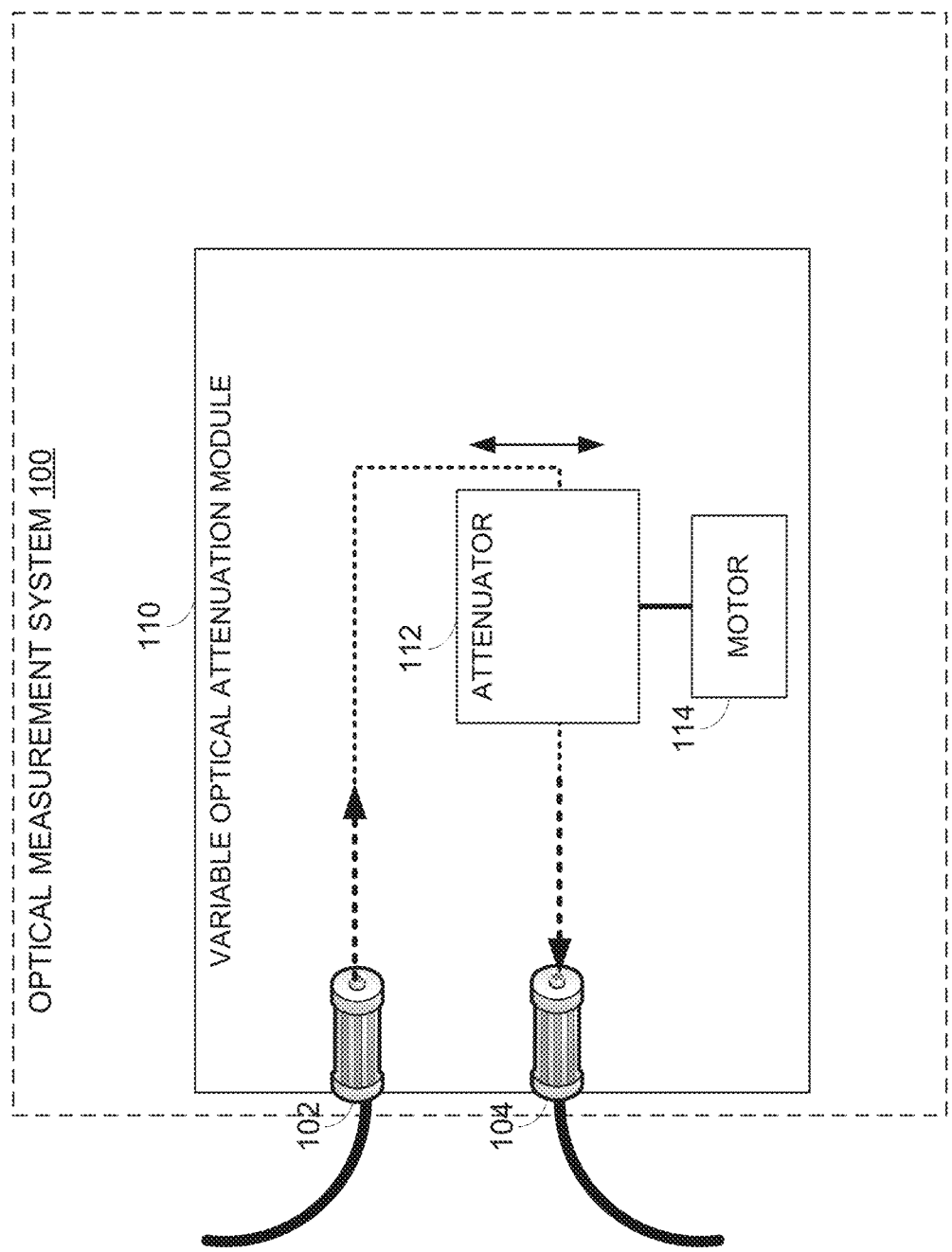
FIG. 1 illustrates a variable optical attenuator (VOA) 110 with a fiber optic input and a fiber optic output that may be part of a measurement system 100, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Variable optical attenuators (VOAs) are used in optical communication systems and optical measurement systems. A VOA is generally designed to adjust a power ratio between a light beam exiting the VOA and a light beam entering the VOA over a variable range by introducing variable optical loss.

According to an example of the present disclosure, a VOA may include an input fiber connected on one side thereof and an output fiber connected to the same side of the VOA. In some examples, the input fiber may be connected to a first collimator and the output fiber may be connected to a second collimator arranged parallel to the first collimator. The VOA may also include a retroreflector to receive a light beam from the input fiber and reflect the light beam to the output fiber. The VOA may further include a first attenuation element positioned between the input fiber and the retroreflector to provide variable attenuation to the light beam. A first adjustment element may move the first attenuation element, which may be a gradient index (GRIN) element, a polarizer, a neutral density filter, a wavelength tunable filter, or a comparable attenuator. The first adjustment element may be a motor, a micro-electromechanical system (MEMS), or similar element.

In some examples, the VOA may also include a second attenuation element positioned between the retroreflector and the output fiber, and a second adjustment element to move the second attenuation element. With two attenuation elements, the elements may be moved (i.e., attenuation provided) synchronously or independently prior to and following the reflection by the retroreflector. For example, the attenuation elements may be GRIN elements with same or distinct attenuation profiles and may be moved together or separately. Similarly, the attenuation elements may be polarizers with orthogonal polarization. In some examples, the VOA may be part of an array with a plurality of VOAs (or VOA modules), where each module may contain same or similar components. In other examples, some components such as the attenuator elements and/or the adjustment elements may be in blocks and controlled separately.

Some advantages and benefits of the systems and methods described herein are readily apparent. For example, VOA modules in a VOA array may be formed as more compact modules allowing ingress and egress (input and output fibers) on a same side, thus allowing a smaller VOA array. Avoiding bends of fibers inside the VOA may increase a reliability of the VOA module. Furthermore, using various types of independently controllable attenuator elements prior to and following reflection, increased granularity and control of introduced loss to the optical signal may be achieved. With angled surface tapping, optical power may be monitored easily pre- and post-attenuation. Other benefits and advantages may also be apparent.

FIG. 1 illustrates a VOA 110 with a fiber optic input and a fiber optic output that may be part of a measurement system 100, according to an example. An input optical signal may be provided by an input optical fiber to the VOA 110. The optical signal may be passed through attenuator 112 and provided to an output optical fiber with power loss. The attenuator 112 may be an optical flat with a transmission intensity gradient across. Loss introduced to the optical signal may be controlled by physically moving the attenuator 112 through a motor 114. The optical signal may be provided into the VOA by the input optical fiber through a collimator 102. The attenuated optical signal may be provided to the output optical fiber through another collimator 104.

In some examples, the VOA 110 may be part of an optical measurement system 100 such as a fiberoptic network tester, an optical spectrum analyzer, or similar systems. In such configurations, the optical measurement system 100 may include multiple VOAs (e.g., to test or measure multiple optical transmission lines) as a VOA array.

Figure 2:
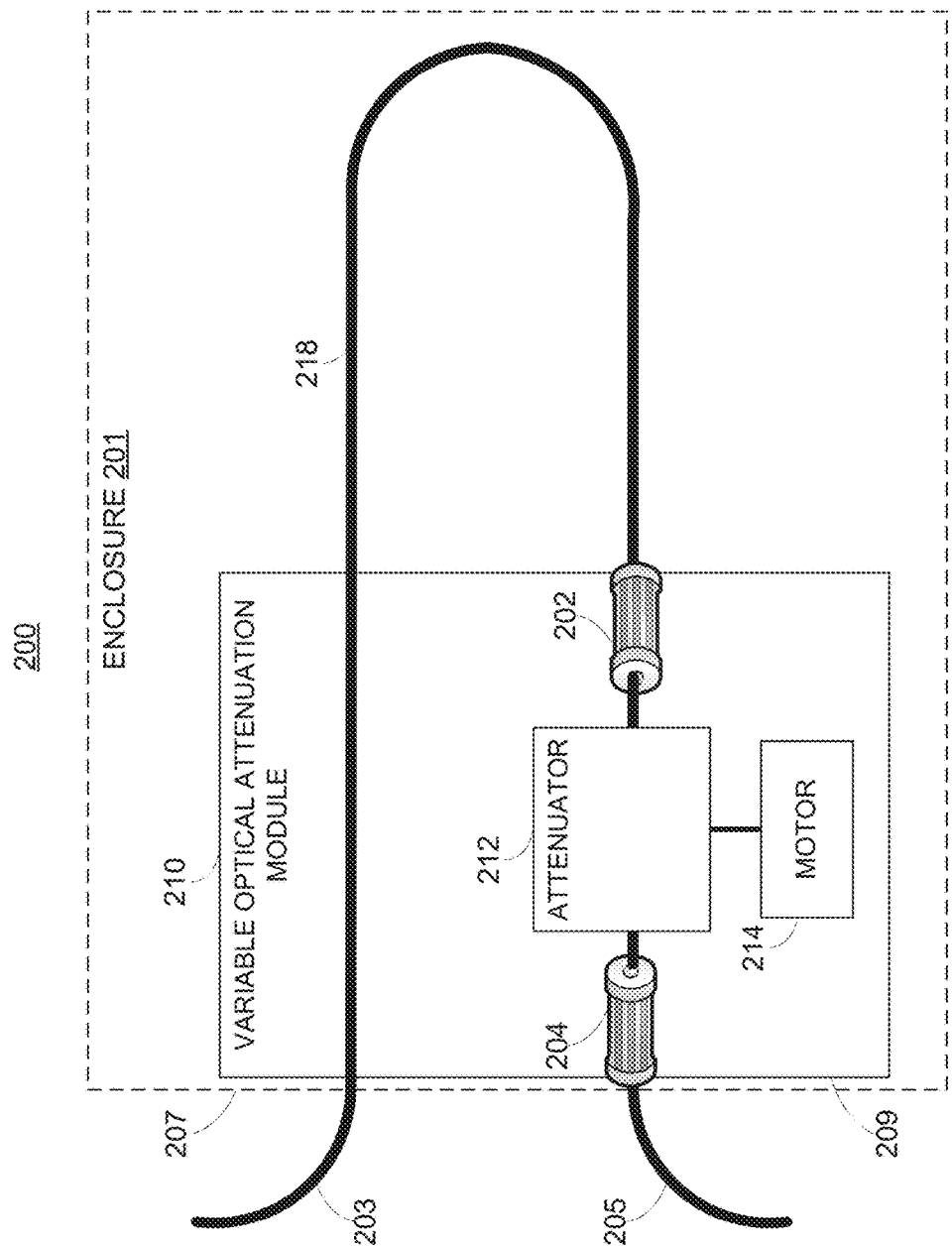
FIG. 2 illustrates diagram 200 of a VOA inside an enclosure with fiber routing.

FIG. 2 illustrates diagram 200 of a VOA inside an enclosure with fiber routing. In a conventional VOA, input collimator 202 and output collimator 204 may be on opposite sides of the attenuator 212 in a typical configuration. Accordingly, an input fiber 203 may enter an enclosure 201 through a surface 207 and be routed (routed fiber 218) inside the enclosure 201 to couple to the input collimator 202. The output collimator 204 may receive the attenuated optical signal on an opposite side of the attenuator 212 and provide to output fiber 205.

In many test or monitoring systems, it may be desirable to have input and output connections on one side of the system (e.g., rack mount systems) for a variety of mechanical and ergonomic reasons. Thus, the routed fiber 218 may be needed to allow one-sided ingress and egress to the VOA module 210 (e.g., surface 209) or measurement system. Due to collimator length and minimum fiber bend radius, a size of the enclosure 201 may be larger than the components (i.e., attenuator and motor 214) forming the VOA module 210. With the larger enclosure (or VOA) size, a number of VOAs that can be fitted into a VOA array may also be limited.

Figure 3A:
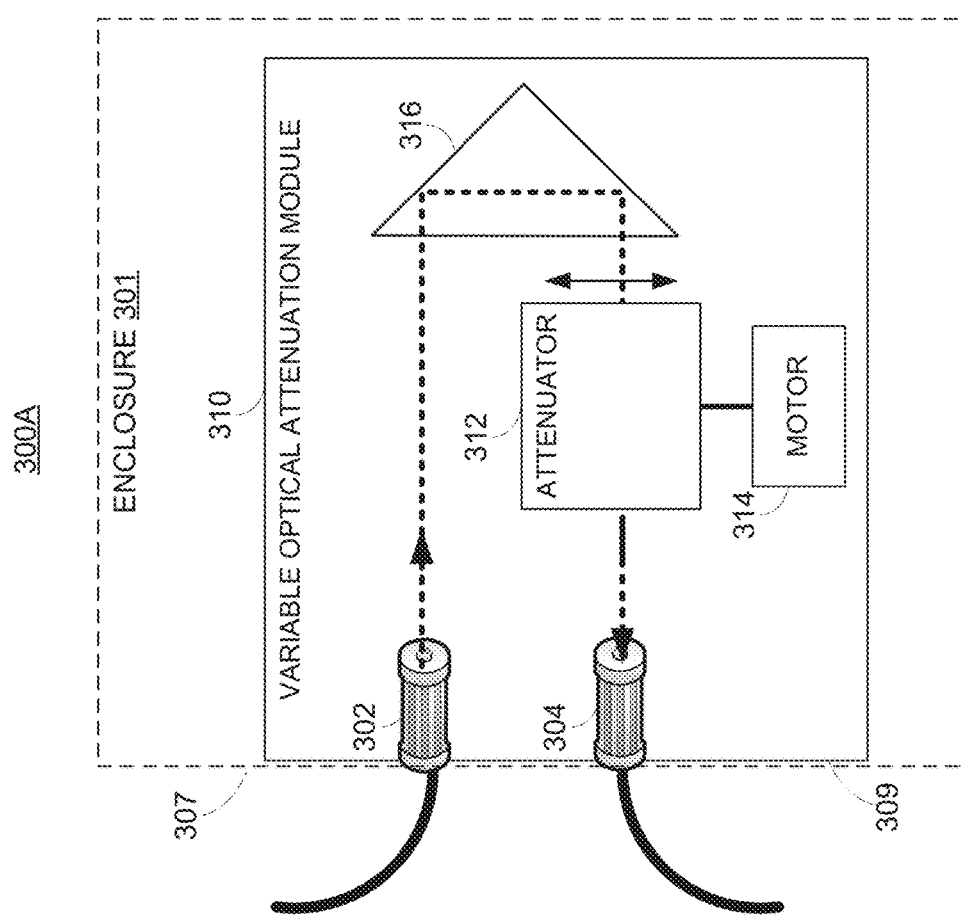
FIGS. 3A-3B illustrate diagrams 300A and 300B of side and top views of a VOA with a retroreflector, according to an example.
Figure 3B:
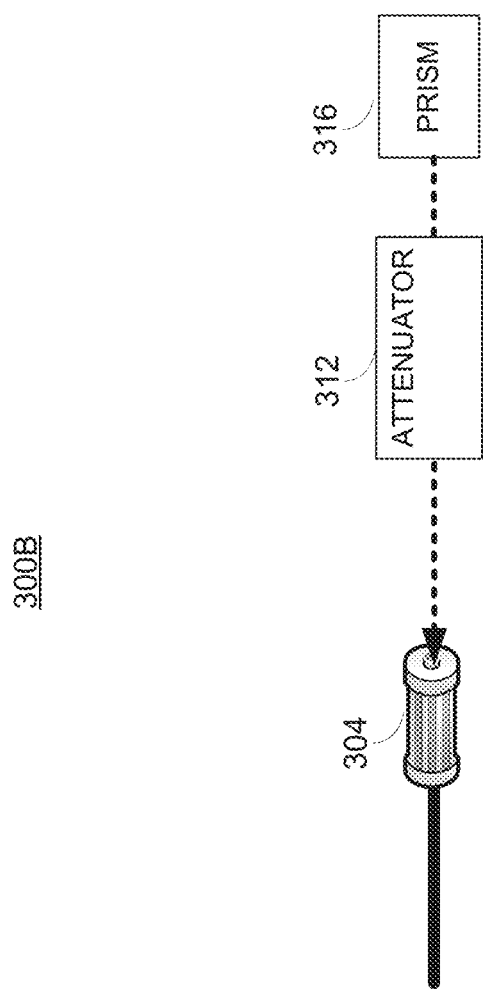

FIGS. 3A-3B illustrate diagrams 300A and 300B of side and top views of a VOA with a retroreflector, according to an example. Diagram 300A in FIG. 3A shows a VOA module 310 including an attenuator 312, a motor 314, and a retroreflector 316. An input optical signal, as discussed herein, may be provided by an input optical fiber to the VOA module 310 through an input collimator 302. The signal may be reflected by the retroreflector 316 onto a parallel path that includes the attenuator 312, which may attenuate the optical signal at a designated level controlled by the motor 314. The attenuated optical signal may then be provided to an output optical fiber through an output collimator 304. The VOA module 310 may be in an enclosure 301.

In some examples, the retroreflector 316 may be a prism (e.g., a right-angle prism that provide parallel path reflection). A size of the retroreflector 316 (e.g., the prism) may be selected based on a separation distance between the input and output collimators 302, 304. However, regardless of the separation distance, the retroreflector is bound to be substantially smaller in size and required space compared to fiber routing inside the enclosure 301. Thus, an overall size of the VOA module 310 may be substantially reduced also allowing higher number of VOA modules to be fitted into a VOA array. In a practical example for visible light attenuation, 30% or more size reduction may be achieved for each VOA module.

Furthermore, the retroreflector 316 may allow the input collimator 302 and the output collimator 304 to be positioned on a same surface (surface 309 of the VOA module 310 and/or surface 307 of the enclosure 301). Thus, ingress and egress may be on the same side allowing easier connectivity to the VOA (or test measurement system) in addition to smaller size.

The motor 314 is an adjustment element, as discussed herein, used to move the attenuator 312 to vary an amount of loss introduced to the optical signal. In practical implementations, the motor may be any type of motor such as an AC motor, a DC motor. The adjustment element is not limited to motors though. The adjustment element may also include micro electro-mechanical systems (MEMS) elements, piezoelectric actuators, or comparable mechanisms that may allow the motion of the attenuator 312.

Diagram 300B in FIG. 3B shows the attenuator 312, output collimator 304, and retroreflector 316 (prism) in a top view. In the illustrated view, the input collimator 302 may be behind the output collimator 304 (thus, not shown). The retroreflector 316 may be a prism reflector (e.g., a right-angle prism), a portion of a cube, an array of small corner reflectors (e.g., through hexagonal tiling), or a mirror and lens combination (e.g., a cat's eye reflector). It should be appreciated that other retroreflective elements, configurations, or combinations of such elements or configurations, may also be provided.

Figure 4:
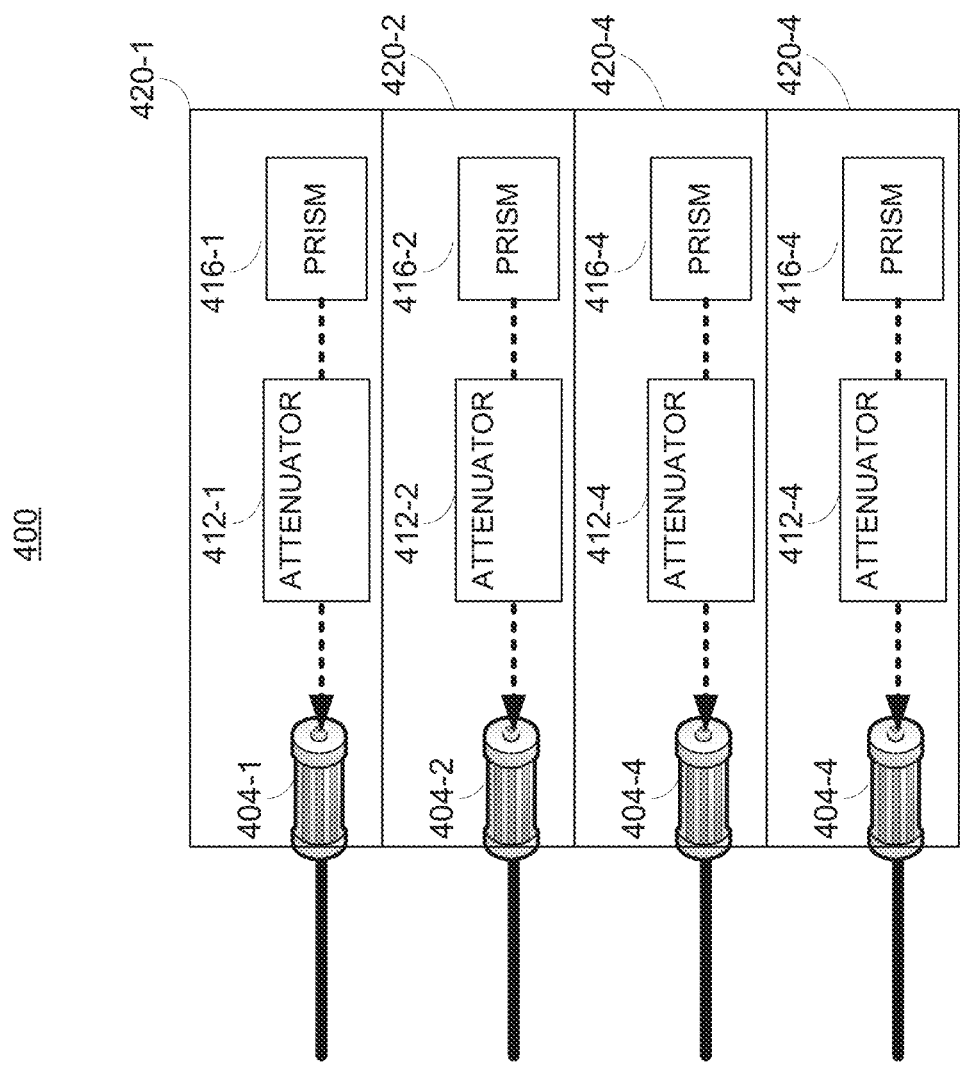
FIG. 4 illustrates diagram 400 of an array of VOAs with retroreflectors, according to an example.

FIG. 4 illustrates diagram 400 of an array of VOAs with retroreflectors, according to an example. As shown in diagram 400, multiple VOAs 420-1, 420-2, 420-3, and 420-4 may be packed into a VOA array. The top view in diagram 400 shows first VOA 420-1 including output collimator 404-1, attenuator 412-1 and retroreflector (e.g., prism) 416-1, second VOA 420-2 including output collimator 404-2, attenuator 412-2 and retroreflector (e.g., prism) 416-2, third VOA 420-3 including output collimator 404-3, attenuator 412-3 and retroreflector (e.g., prism) 416-3, and fourth VOA 420-4 including output collimator 404-4, attenuator 412-4 and retroreflector (e.g., prism) 416-4.

In some examples, the retroreflectors in the respective VOAs may eliminate a need for fiber routing inside the VOA (or inside the larger enclosure of a measurement system), thereby reducing a size of the individual VOAs and the VOA array substantially. Furthermore, by avoiding fiber routing, a reliability of the VOA array may be enhanced as a risk of fibers being folded or otherwise damages may decrease. Manufacturability and maintenance of the VOAs and the VOA array may also be made easier and less complex due to the retroreflector(s).

Figure 5A:
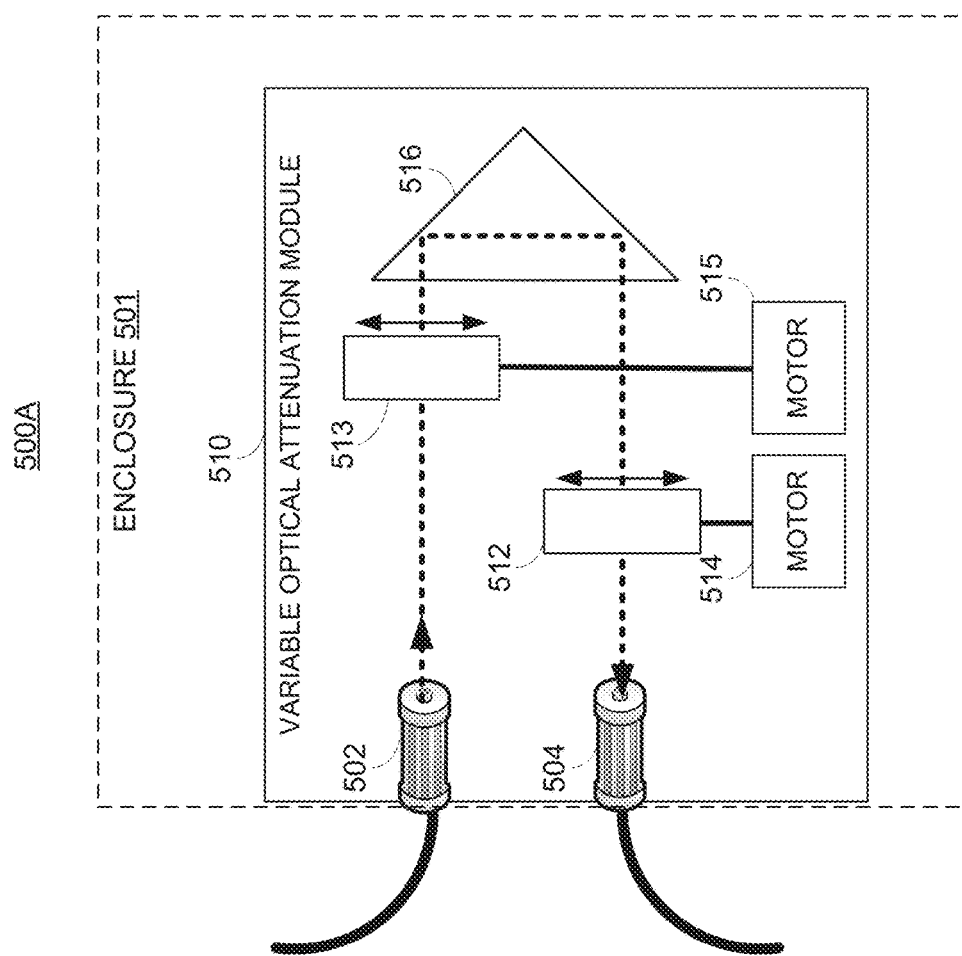
FIG. 5A illustrates diagram 500A of a VOA with attenuator elements on input and output light beams, where the attenuator elements are controlled independently, according to an example.

FIG. 5A illustrates diagram 500A of a VOA with attenuator elements on input and output light beams, where the attenuator elements are controlled independently, according to an example. Diagram 500A shows a VOA module 510 inside an enclosure 501 with an input collimator 502, an output collimator 504, a retroreflector 516, an input attenuator 513, and an output attenuator 512. The input attenuator 513 and the output attenuator 512 may be moved (thereby the introduced loss controlled) by respective motors 515 and 514.

Typical VOAs may provide up to 70 dB loss. By providing two separate attenuators pre- and post-reflection, a total loss to be introduced by the VOA may be increased (e.g., 120 dB). Furthermore, by controlling the input attenuator 513 and the output attenuator 512 independently, a granularity of attenuation may be increased too as discussed in more detail in conjunction with FIGS. 6A and 6B.

Figure 5B:
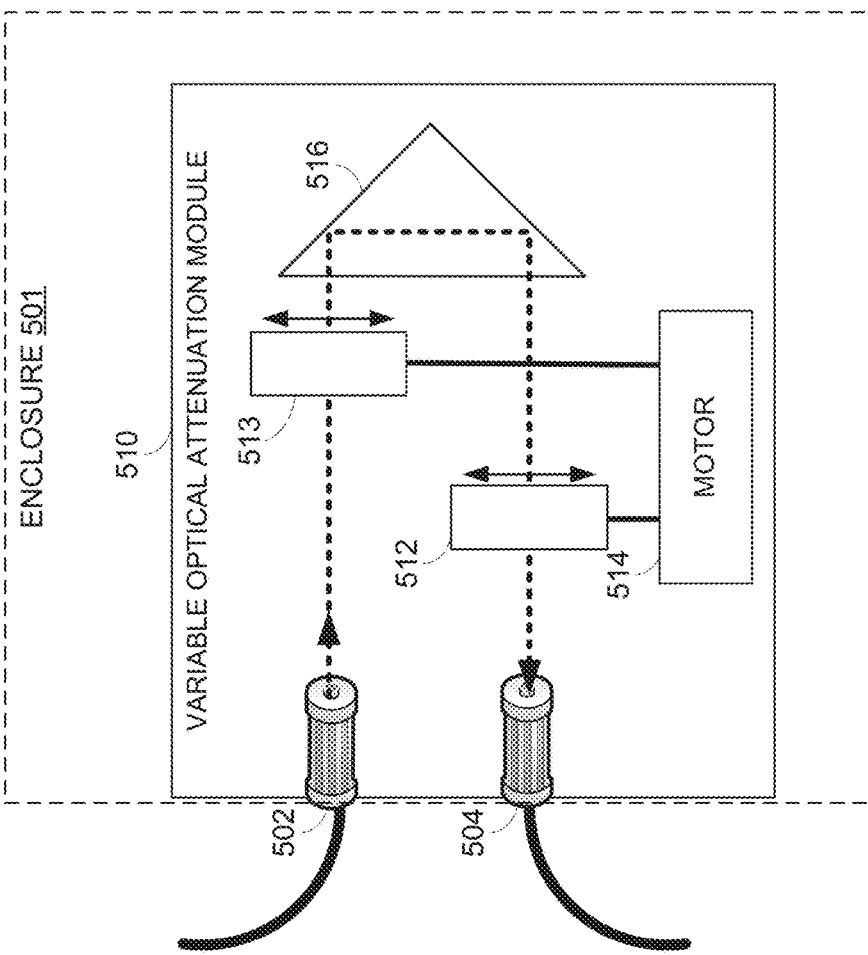
FIG. 5B illustrates diagram 500B of a VOA with attenuator elements on input and output light beams, where the attenuator elements are controlled jointly, according to an example.

FIG. 5B illustrates diagram 500B of a VOA with attenuator elements on input and output light beams, where the attenuator elements are controlled jointly, according to an example. Diagram 500B shows a VOA module 510 inside the enclosure 501 with an input collimator 502, an output collimator 504, a retroreflector 516, an input attenuator 513, and an output attenuator 512. The input attenuator 513 and the output attenuator 512 may be moved (thereby the introduced loss controlled) by a single motor 514.

In some examples, both attenuators may be moved, thus, introduced loss increased or decreased, simultaneously. In such scenarios, the input attenuator 513 and the output attenuator 512 may have same attenuation profile. Thus, by moving both the input attenuator 513 and the output attenuator 512 simultaneously, the introduced loss may be doubled compared to a single attenuator (pre- or post-reflection). In other examples, the attenuators may have different attenuation profiles. Thus, increased loss with higher granularity may be introduced to the optical signal.

Figure 6A:
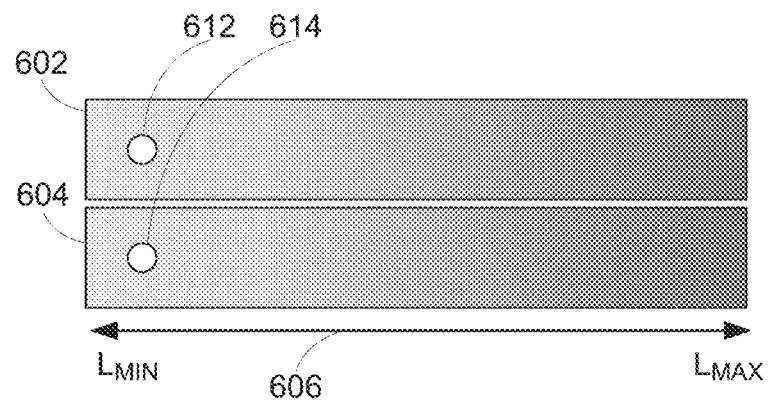
FIGS. 6A-6B illustrate attenuator elements for input and output light beams of a VOA with different attenuation profiles, according to examples.
Figure 6B:
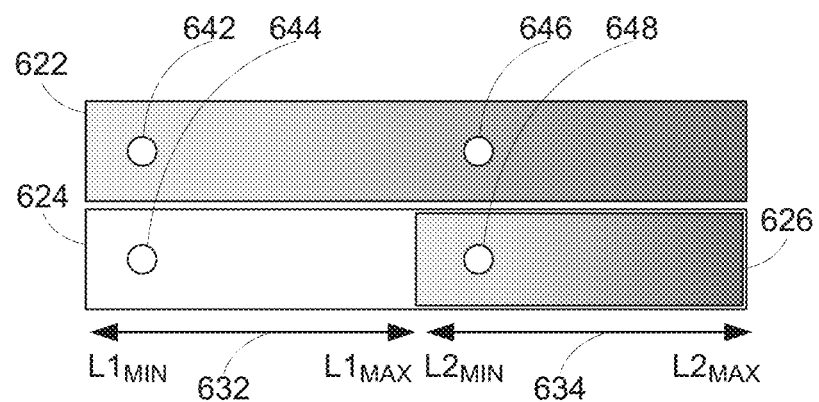

FIGS. 6A-6B illustrate attenuator elements for input and output light beams of a VOA with different attenuation profiles, according to examples. FIG. 6A shows input (pre-reflection) attenuator 602 and output (post-reflection) attenuator 604 with locations of respective light beams 612 and 614 in an example attenuator setting.

The input attenuator 602 and the output attenuator 604 may have same attenuation profile 606 (minimum loss being Lm in and maximum loss being Lmax). For example, both attenuators may be gradient index (GRIN) elements with same refractive index gradient. In an example implementation, Lm in may be 0 dB (no loss) and Lmax may be 120 dB. Other loss values may also be arranged. The example configuration of FIG. 6A may provide higher attenuation range.

In some examples, the retroreflector (e.g., prism) may be oriented such that the retroreflected beam returns in the same plane as the motion of the attenuator, thus providing two passes through the attenuator, but at different attenuation points with a net attenuation being the sum of the two attenuations. The two-pass configuration may offer a higher resolution low attenuation combined with high dynamic range and potentially allow for a larger beam, which may provide better power handling and multimode performance.

FIG. 6B shows another configuration, where an input attenuator and an output attenuator may have different attenuation profiles and allow fine control (granularity) and higher attenuation. In the specific example of FIG. 6B, the input attenuator 622 may have a low-loss range 632, for example, L1min=0 dB to L1max=15 dB, and a higher loss range 634, for example, L2min=15 dB to L2max=100 dB. The output attenuator may comprise two portions, a lossless first portion 624 and a higher loss second portion 626 (e.g., same attenuation profile as the input attenuator 622).

In an example operation, only the input beam (pre-reflection) may interact with the low-loss attenuation range (0 dB-15 dB) at position 642. At this point, the second attenuation pattern (no loss range) may line up and start to interact with the beam at position 644. In such a way, fine control may be achieved at the low-end, while enabling a high-end attenuation, where the beam may be subjected to loss at position 646 at input and at position 648 at output.

Figure 6C:
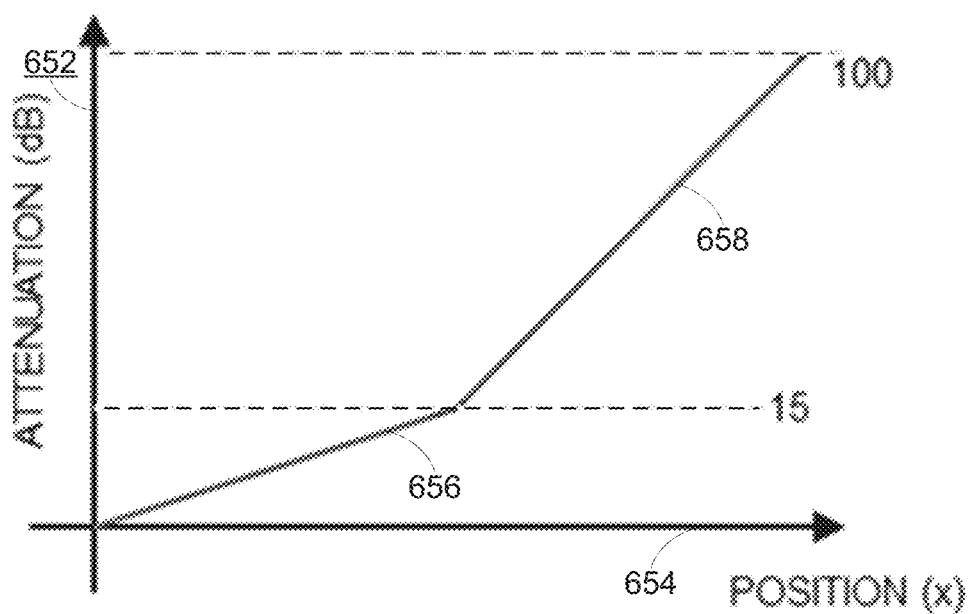
FIG. 6C illustrates attenuation characteristic of an attenuator element, according to an example.

FIG. 6C illustrates attenuation characteristic of an attenuator element, according to an example. The attenuation characteristic of the input attenuator 622 in FIG. 6B is shown across attenuation axis 652 and position axis 654 (along the attenuator). As discussed above, the attenuation may include two linear increase ranges: low-loss range 656 starting at 0 dB and ending at 15 dB, and the higher loss range 658 starting at 15 dB and ending at 100 dB.

In some examples, the attenuator elements may be constructed by patterning the input attenuator and the output attenuator photolithographically at the same time, or by producing two independent parts on glass in a two-step process and then affixing (e.g., gluing) and aligning the attenuator elements using alignment marks deposited on the attenuator element at the time the attenuation material is deposited.

Figure 7A:
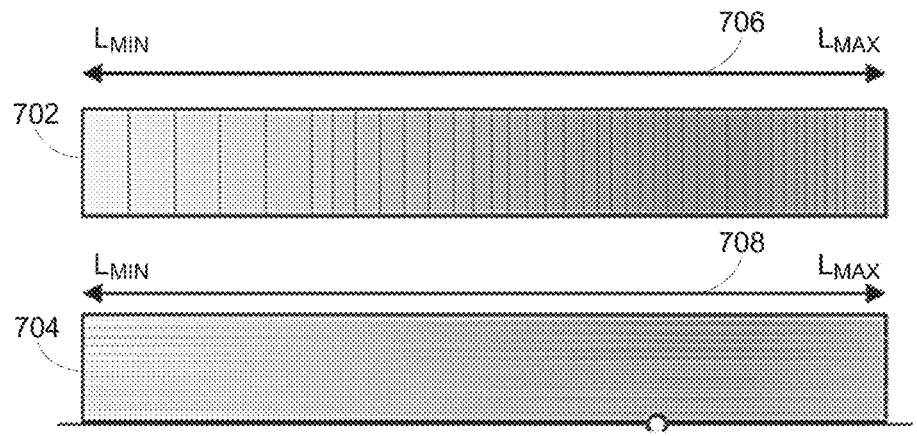
FIGS. 7A-7B illustrate two configurations of polarization dependent loss (PDL) attenuator elements, according to examples.
Figure 7B:
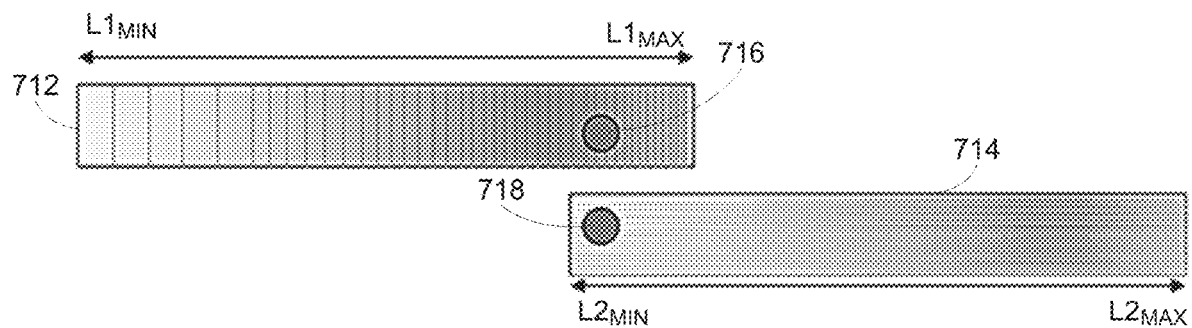

FIGS. 7A-7B illustrate two configurations of polarization dependent loss (PDL) attenuator elements, according to examples. While example attenuators discussed previously are polarization-independent, the attenuator configurations shown in FIG. 7A and FIG. 7B are polarization-dependent attenuators, thus provide polarization-dependent loss (PDL). As shown in FIG. 7A, a polarization-dependent attenuator may comprise two elements. The first element 702 may have a spatially varying extinction ratio for the linear-horizontal state of polarization (SOP), while the second element 704 may have a spatially varying extinction ratio for the linear-vertical SOP.

Accordingly, two polarizer arrays of varying extinction ratio, which may be tuned relative to each other may be used to introduce loss to the optical signal. Both, the first element 702 and the second element 704 may have linearly increasing loss profiles 706, 708 due to their respective spatially varying extinction ratios. In both cases, the extinction ratio may vary between 0 dB and 3 dB. By independently tuning the positions of the first element 702 and the second element 704, the introduced loss may be selected for both polarizations independently. Hence, a variable SOP artifact may be created.

FIG. 7B shows an example operational point, where the input beam 716 (pre-reflection) is set to experience 3 dB of loss for the horizontal SOP through the first element 712, and the output beam 718 (post-reflection) is set to a lossless position at the second element 714. Hence the illustrated configuration may create 3 dB of PDL in such a state.

Figure 8A:
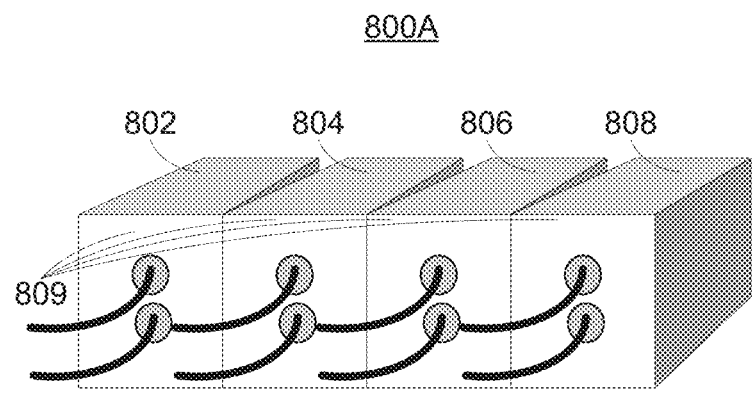
FIG. 8A illustrates a perspective view of an array of VOAs with retroreflectors with each VOA having its own attenuator element and adjustment element, according to an example.

FIG. 8A illustrates a perspective view of an array of VOAs with retroreflectors with each VOA having its own attenuator element and adjustment element, according to an example. Diagram 800A shows modular, reduced-size VOAs with self-contained actuator and optics assembled into a VOA array. Thus, each of the VOAs 802, 804, 806, and 808 may include their own collimators, retroreflectors, and attenuators along with adjustment elements (e.g., motors) for the attenuators. As discussed herein, through the use of retroreflectors, input fibers and output fibers may be coupled to the individual VOAs 802, 804, 806, and 808 through a same surface, for example, front surfaces 809. In some examples, a common power supply may energize the adjustment elements. Controls (not shown) for setting loss levels may be positioned on individual VOAs 802, 804, 806, and 808, or at a separate location on an enclosure housing the VOA array.

In some examples, the controls for setting loss levels of the individual VOAs 802, 804, 806, and 808 may be remote. Thus, the adjustment elements may be controlled through a remote device communicatively coupled to the VOA array via wired or wireless means. As discussed herein, the adjustment elements may be miniature motors or various types or micro-electromechanical system (MEMS) elements. The retroreflectors may include a gradient index (GRIN) element, a polarizer, a neutral density filter, or a wavelength tunable filter.

Figure 8B:
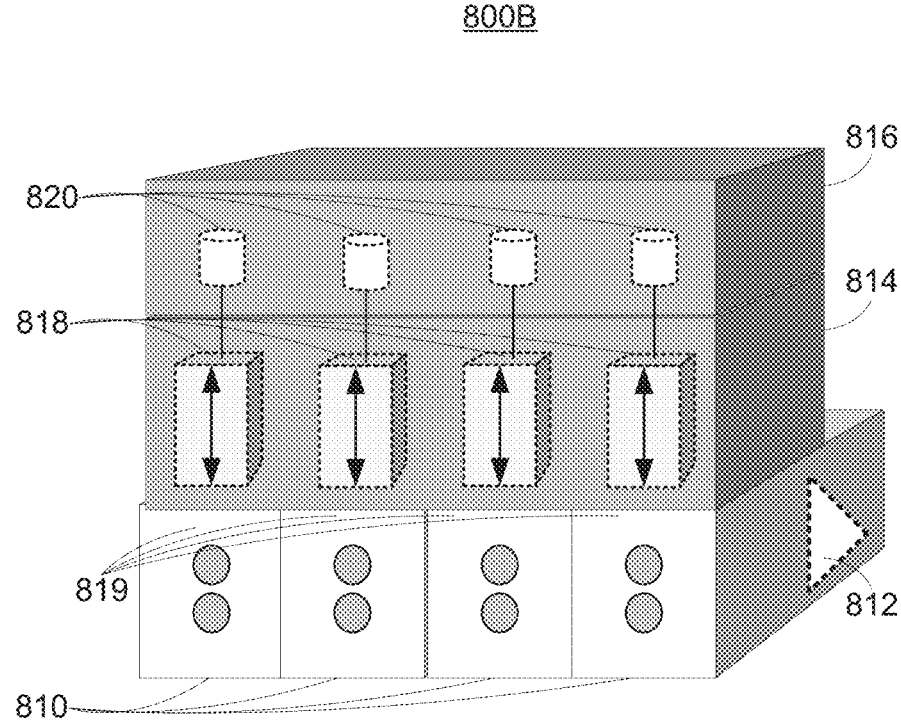
FIG. 8B illustrates a perspective view of an array of VOAs with retroreflectors, where attenuator elements and adjustment elements are in separate blocks, according to an example.

FIG. 8B illustrates a perspective view of an array of VOAs with retroreflectors, where attenuator elements and adjustment elements are in separate blocks, according to an example. Diagram 800B shows a VOA array comprising a modular VOA block 810, a modular optical-array (attenuation array) block 814, and a modular actuator-array (adjustment array) block 816 mated together. The individual VOAs in the modular VOA block 810 may include optical signal inputs and outputs (e.g., collimators) and respective retroreflectors 812. The modular optical-array block 814 may include respective attenuators 818 (single or dual) for each VOA in the modular VOA block 810. The attenuators 818 in the modular optical-array block 814 may be moved (thus, introduced loss set) by respective adjustment elements 820 in the modular actuator-array block 816.

In some examples, further miniaturization may be achieved through the mated together modular VOA block 810, the modular optical-array block 814, and the modular actuator-array block 816. By arraying the optical elements and actuators separately, smaller sizes may be achieved, at reduced cost, material, and/or complexity. Separate electrical, optical, and mechanical monolithic blocks, combined together, may provide increased reliability in addition to reduced cost and size. VOA beam interception (for loss introduction) may be in-plane or cross-plane. Through the use of retroreflectors, input fibers and output fibers may be coupled to the individual VOA modules in the VOA block 810 through a same surface, for example, front surfaces 819.

Figure 9:
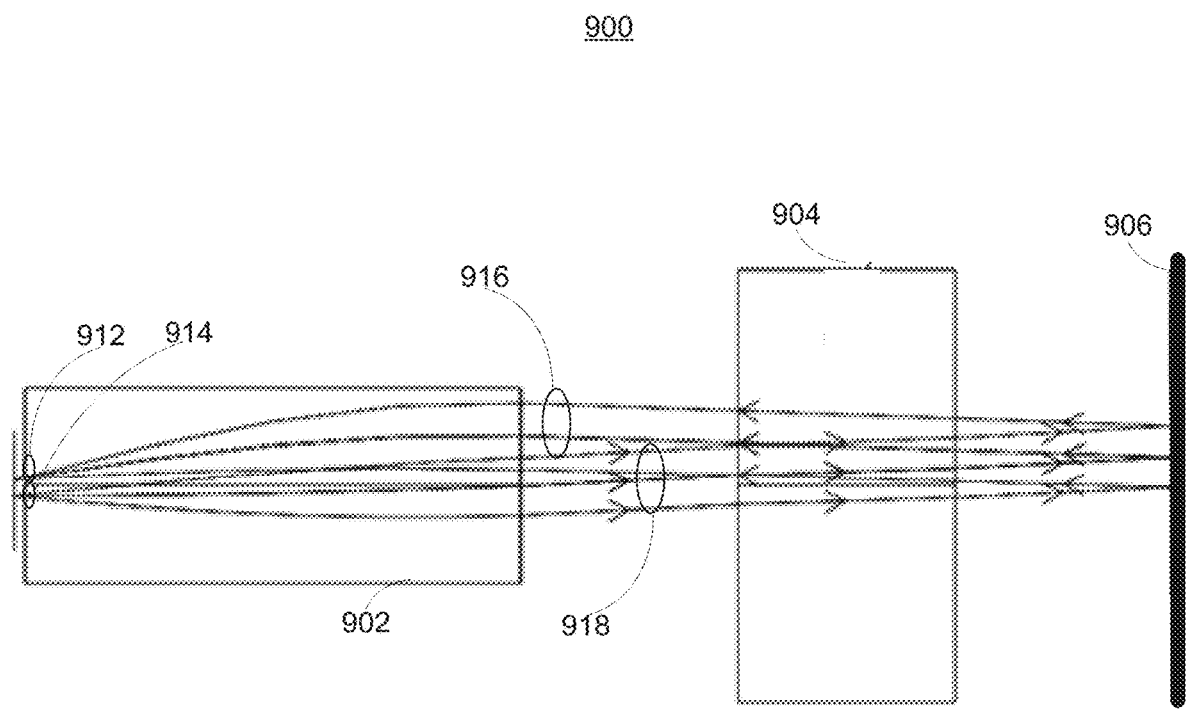
FIG. 9 illustrates diagram 900 of a VOA with a single collimator for delivery and collection, where the light beam is passed twice through the attenuator element, according to an example.

FIG. 9 illustrates diagram 900 of a VOA with a single collimator for delivery and collection, where the light beam is passed twice through the attenuator element, according to an example. Diagram 900 shows an example configuration, where the light beam is pass twice through the attenuator element using mirrors. A single collimator 902 may include an input 912 and an output 914 for input light beam 916 and output light beam 918 with an object surface (input fiber location) and image surface (output fiber location) represented by element 912. A slightly off-normal mirror 906 may be used to reflect the beam(s) back. By selecting the angle(s) of the mirror 906 suitably, the input beam 916 (and the output beam 918) may be reflected before the output beam is provided to the output fiber, thus introducing additional loss through the attenuator element 904. Thus, input light coming from input 912 may be collimated by collimator 902, travel through attenuator element 904, be reflected by the off-normal mirror 906, travel again through the attenuator element 904, be focused by the collimator 902, and be collected by the output 914. In some examples, an angular tilt of the off-normal mirror 906 may be in a range from about 1 degree to a few degrees (e.g., 4 degrees).

In some examples, the collimator 902 may be a single GRIN-lens collimator that combines the delivery and collection functions of the collimator. Two fibers (input and output) may be separated vertically in a capillary tube assembly. Beam separation ("walk-off") may be achieved by launching off-axis on the GRIN-lens collimator. In example configuration, the VOA is double-passed through the attenuator element 904, achieving a higher range of attenuation, albeit at lower granular control.

Figure 10:
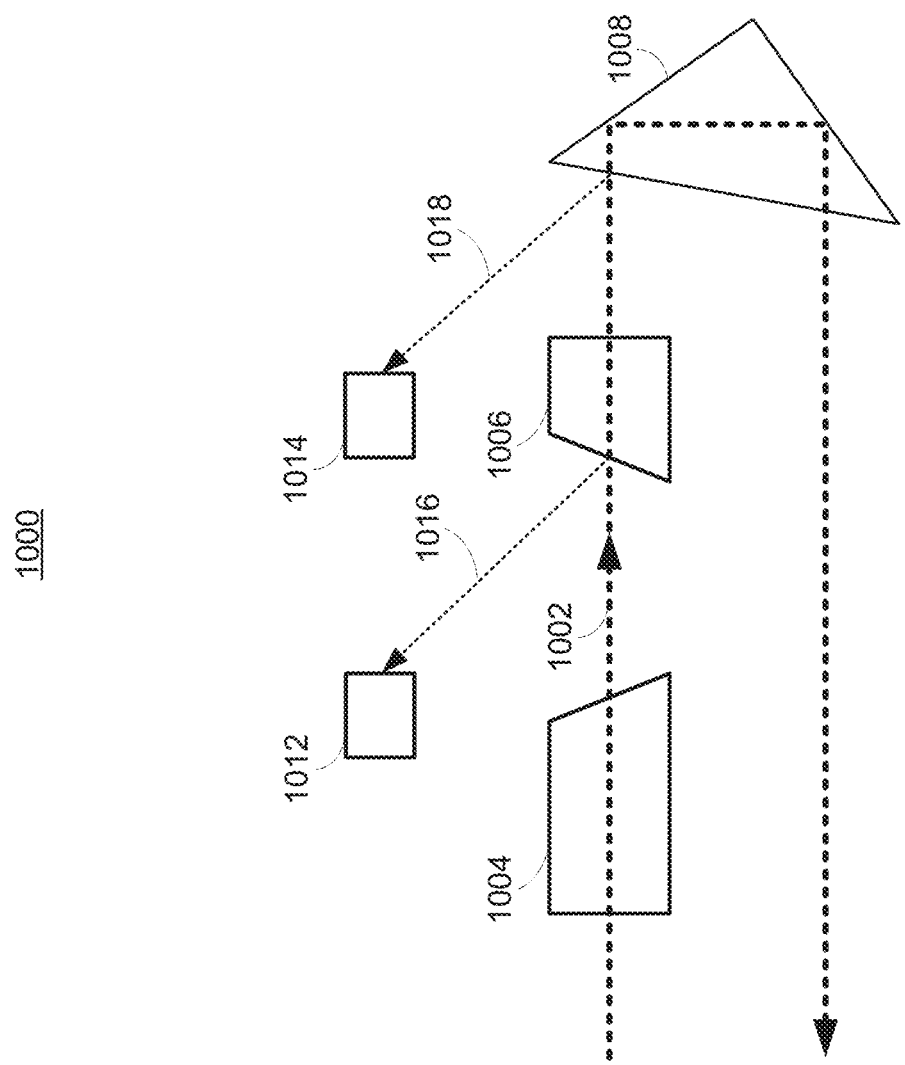
FIG. 10 illustrates diagram 1000 of a VOA, where angled surfaces are used to tap and monitor optical signals, according to an example.

FIG. 10 illustrates diagram 1000 of a VOA, where angled surfaces are used to tap and monitor optical signals, according to an example. Diagram 1000 shows a configuration, where the optical signal (i.e., optical power level) may be monitored pre- and post-attenuation. The example VOA may include a collimator 1004, an attenuator element 1006, and a retroreflector 1008. A surface of the attenuator element 1006 receiving the optical signal 1002 may be angled at a non-orthogonal angle to the optical signal such that a portion of the optical signal 1002 prior to attenuation may be reflected and captured by a photo detector 1012 as optical signal 1016. A surface of the retroreflector 1008 receiving (and transmitting) the optical signal 1002 post-attenuation may also be angled at a non-orthogonal angle to the optical signal such that a portion of the attenuated optical signal 1002 may be reflected and captured by another photo detector 1014 as optical signal 1018. Thus, power levels of the optical signal 1002 before and after attenuation may be monitored independently.

In some examples, a second attenuator element may be positioned on the path of the optical signal 1002 post-reflection as discussed herein. Angled surfaces and additional photo detectors may also be used on the post-reflection path similar to the configuration discussed above.

It should be appreciated that the retroreflector based variable optical attenuator discussed herein may be implemented with various configurations using fewer or additional elements implementing the principles described herein. The configurations shown in various figures are intended as illustrative examples.

Figure 11:
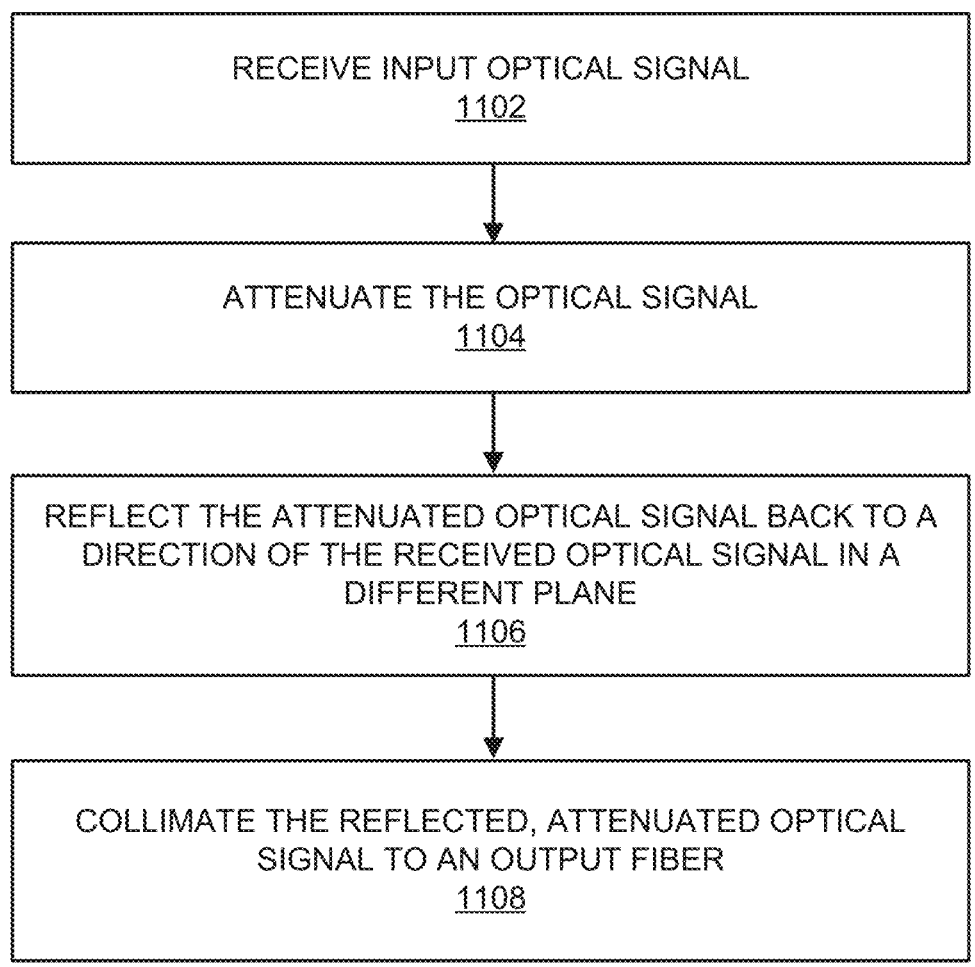
FIG. 11 illustrates a flow chart of a method 1100 for attenuating a light beam in a VOA using a retroreflector, according to an example.

FIG. 11 illustrates a flow chart of a method 1100 for attenuating a light beam in a VOA using a retroreflector, according to an example. The method 1100 is provided by way of example, as there may be a variety of ways to carry out the method described herein. Although the method 1100 is primarily described as being performed by the configurations of FIGS. 3A-3B and 5A-5B, the method 1100 may be executed or otherwise performed by one or more components of another system or a combination of systems. Each block shown in FIG. 11 may further represent one or more processes, methods, or subroutines, and one or more of the blocks (e.g., the selection process) may include machine readable instructions stored on a non-transitory computer readable medium and executed by a processor or other type of processing circuit to perform one or more operations described herein.

At block 1102, an optical signal may be received from an input fiber at an input collimator of a VOA. The VOA may be a standalone VOA or a VOA module that is part of a VOA array with other modules.

At block 1104, the optical signal may pass through an attenuator element, which may include a gradient index (GRIN) element, a polarizer, a neutral density filter, or a wavelength tunable filter. A loss introduced to the optical signal may be set by physical movement of the attenuator element (or parts of the attenuator element) by an adjustment element (e.g., a motor).

At block 1106, the attenuated optical signal may be received and reflected back in a different plane by a retroreflector. The retroreflector may be a right-angle prism in some practical implementations. Dimensions of the retroreflector may be selected based on separation of the input and output collimators (thus, input and output fibers) such that the reflected optical signal may be aligned with the output collimator. In some examples, a second attenuator element may be positioned on a path of the optical signal post-reflection to introduce further loss or to provide granularity in the introduced loss.

At block 1108, the reflected and attenuated optical signal may be provided to an output fiber through an output collimator. In some examples, a single collimator may be used as input and output collimator, where the input and output fibers may be separated in a capillary tube assembly, for example.

While examples described herein are directed to configurations as shown, it should be appreciated that any of the components described or mentioned herein may be altered, changed, replaced, or modified, in size, shape, and numbers, or material, depending on application or use case, and adjusted for desired results.

Moreover, single components may be provided as multiple components, and vice versa, to perform the functions and features described herein. It should be appreciated that the components of the system described herein may operate in partial or full capacity, or it may be removed entirely. It should also be appreciated that techniques described herein with respect to the optical systems, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of a control system and/or run one or more applications that utilize data from other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A variable optical attenuator (VOA) apparatus, comprising:
    an enclosure;
    a first collimator positioned on a first surface of the enclosure and coupled to an input optical fiber;
    a second collimator positioned on the first surface of the enclosure and coupled to an output optical fiber;
    a retroreflector within the enclosure to receive a light beam from the first collimator and reflect the light beam to the second collimator;
    a first attenuation element positioned between the first collimator and the retroreflector within the enclosure to provide variable attenuation to the light beam;
    a second attenuation element positioned between the retroreflector and the second collimator within the enclosure; and
    at least one adjustment element within the enclosure to move the first attenuation element and the second attenuation element.

2. The VOA apparatus of claim 1, wherein the at least one adjustment element comprises a first adjustment element within the enclosure to move the first attenuation element.

3. The VOA apparatus of claim 2, wherein the first adjustment element comprises a motor or a micro-electromechanical system (MEMS).

4. The VOA apparatus of claim 2, wherein the at least one adjustment element further comprises:
    a second adjustment element within the enclosure to move the second attenuation element.

5. The VOA apparatus of claim 4, wherein at least one of the first attenuation element or the second attenuation element comprises a gradient index (GRIN) element, a polarizer, a neutral density filter, or a wavelength tunable filter.

6. The VOA apparatus of claim 5, wherein
    the first attenuation element comprises a first GRIN element and the second attenuation element comprises a second GRIN element, and
    the first GRIN element and the second GRIN element have a same attenuation profile.

7. The VOA apparatus of claim 5, wherein
    the first attenuation element comprises a first GRIN element and the second attenuation element comprises a second GRIN element, and
    the first GRIN element and the second GRIN element have distinct attenuation profiles.

8. The VOA apparatus of claim 5, wherein
    the first attenuation element comprises a polarizer with a first polarization, and
    the second attenuation element comprises another polarizer with a second polarization distinct from the first polarization.

9. The VOA apparatus of claim 4, wherein the at least one adjustment element is to move the first attenuation element and the second attenuation element are moved synchronously or independently.

10. The VOA apparatus of claim 1, further comprising a first detector and a second detector, wherein
    a receiving surface of the first attenuation element and a receiving surface of the retroreflector are at a non-orthogonal angle to the light beam,
    the first detector is to detect a reflected portion of the light beam from the receiving surface of the first attenuation element, and
    the second detector is to detect another reflected portion of the light beam from the receiving surface of the retroreflector.

11. A variable optical attenuator (VOA) array, comprising:
    a plurality of VOA modules, each VOA module comprising:
        an enclosure;
        a first collimator positioned on a first surface of the enclosure and coupled to an input optical fiber;
        a second collimator positioned on the first surface of the enclosure and coupled to an output optical fiber;
        a retroreflector within the enclosure to receive a light beam from the first collimator and reflect the light beam to the second collimator;
        a first attenuation element positioned between the first collimator and the retroreflector within the enclosure to provide variable attenuation to the light beam;

a second attenuation element positioned between the retroreflector and the second collimator within the enclosure; and at least one adjustment element within the enclosure to move the first attenuation element and the second attenuation element.

12. The VOA array of claim 11, wherein
the at least one adjustment element within the enclosure is to move the first attenuation element and the second attenuation element synchronously or independently.

13. The VOA array of claim 12, wherein at least one of the first attenuation element or the second attenuation element comprises a gradient index (GRIN) element, a polarizer, a neutral density filter, or a wavelength tunable filter.

14. The VOA array of claim 12, wherein
the first attenuation element comprises a polarizer with a first polarization, and
the second attenuation element comprises another polarizer with a second polarization orthogonal to the first polarization.

15. A variable optical attenuator (VOA) array, comprising:
a VOA array block comprising:
an enclosure; and
a plurality of VOA modules, each VOA module comprising:
a first collimator positioned on a first surface of the enclosure and coupled to an input optical fiber;
a second collimator positioned on the first surface of the enclosure and coupled to an output optical fiber; and
a retroreflector within the enclosure to receive a light beam from the first collimator and reflect the light beam to the second collimator;
an attenuation array block comprising:
a plurality of first attenuation elements, wherein each first attenuation element of the plurality of first attenuation elements is connected to be positioned between the first collimator and the retroreflector of a respective VOA module; and
a plurality of second attenuation elements, wherein each second attenuation element of the plurality of second attenuation elements is connected to be positioned between the retroreflector and the second collimator of a respective VOA module; and
an adjustment array block comprising:
a plurality of first adjustment elements, wherein each first adjustment element of the plurality of first adjustment elements is to move a corresponding first attenuation element of the plurality of first attenuation elements; and
a plurality of second adjustment elements, wherein each second adjustment element of the plurality of second adjustment elements is to move a corresponding second attenuation element of the plurality of second attenuation elements.

16. The VOA array of claim 15, wherein the plurality of first adjustment elements and the plurality of second adjustment elements comprise motors or micro-electromechanical systems.

17. The VOA array of claim 15, wherein the plurality of first attenuation elements and the plurality of second attenuation elements comprise motors or micro-electromechanical systems (MEMS).

18. The VOA array of claim 15, wherein the plurality of first attenuation elements and the plurality of second attenuation elements comprise one or more of a gradient index (GRIN) element, a polarizer, a neutral density filter, or a wavelength tunable filter.

19. The VOA array of claim 15, wherein
the plurality of first attenuation elements comprise a first plurality of GRIN elements and the plurality of second attenuation elements comprise a second plurality of GRIN elements, and
the first plurality of GRIN elements and the second plurality of GRIN elements have a same attenuation profile.

20. The VOA array of claim 15, wherein
the plurality of first attenuation elements comprise a first plurality of GRIN elements and the plurality of second attenuation elements comprise a second plurality of GRIN elements, and
the first plurality of GRIN elements and the second plurality of GRIN elements have distinct attenuation profiles.

* * * * *